(12) United States Patent
Vanunu et al.

(10) Patent No.: US 11,165,820 B2
(45) Date of Patent: Nov. 2, 2021

(54) WEB INJECTION PROTECTION METHOD AND SYSTEM

(71) Applicant: CHECK POINT SOFTWARE TECHNOLOGIES LTD., Tel Aviv (IL)

(72) Inventors: Oded Vanunu, Rishon Lezion (IL); Liad Mizrachi, Petach Tikva (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 406 days.

(21) Appl. No.: 14/881,180

(22) Filed: Oct. 13, 2015

(65) Prior Publication Data

US 2017/0104783 A1 Apr. 13, 2017

(51) Int. Cl.
*G06F 12/14* (2006.01)
*H04L 29/06* (2006.01)
*G06F 16/22* (2019.01)
*G06F 21/64* (2013.01)

(52) U.S. Cl.
CPC .......... *H04L 63/1466* (2013.01); *G06F 16/22* (2019.01); *G06F 21/64* (2013.01); *G06F 2221/2119* (2013.01)

(58) Field of Classification Search
CPC . G06F 21/56; H04L 63/1466; H04L 63/1483; H04L 29/06931
USPC ........................................................ 726/22
See application file for complete search history.

(56) References Cited

U.S. PATENT DOCUMENTS

| 7,343,626 | B1* | 3/2008 | Gallagher | G06F 21/577 |
| | | | | 707/999.003 |
| 8,595,810 | B1* | 11/2013 | Ben Ayed | H04L 63/0815 |
| | | | | 713/168 |
| 8,819,049 | B1 | 8/2014 | Yeo et al. | |
| 9,178,904 | B1* | 11/2015 | Gangadharan | G06F 21/00 |
| 9,230,105 | B1* | 1/2016 | Satish | G06F 21/56 |
| 2002/0103827 | A1* | 8/2002 | Sesek | G06F 17/243 |
| | | | | 715/224 |
| 2005/0188222 | A1* | 8/2005 | Motsinger | G06F 21/316 |
| | | | | 726/5 |
| 2005/0198099 | A1* | 9/2005 | Motsinger | G06F 21/55 |
| | | | | 709/200 |
| 2008/0222736 | A1* | 9/2008 | Boodaei | G06F 21/128 |
| | | | | 726/27 |
| 2008/0314968 | A1* | 12/2008 | Maher | G06Q 10/10 |
| | | | | 235/375 |

(Continued)

FOREIGN PATENT DOCUMENTS

| KR | 101171212 B1 | 8/2012 |
| KR | 101175951 B1 | 8/2012 |
| KR | 20130110374 A | 10/2013 |

*Primary Examiner* — Luu T Pham
*Assistant Examiner* — Jenise E Jackson
(74) *Attorney, Agent, or Firm* — Mark M. Friedman (57) ABSTRACT

Computerized methods and systems detect unauthorized and potentially malicious, as well as malicious records, typically in the form of electronic forms, such as those where users input information (into input blocks or fields), such as bank and financial institution electronic forms and the like. Should such an unauthorized form, be detected, the detection causes the taking of protective action by the computer whose on whose browser the unauthorized form has been rendered.

16 Claims, 4 Drawing Sheets

(56) References Cited

U.S. PATENT DOCUMENTS

| | | | |
|---|---|---|---|
| 2010/0217709 A1* | 8/2010 | Aabye | G06Q 20/10 705/44 |
| 2011/0239300 A1* | 9/2011 | Klein | G06F 21/565 726/23 |
| 2012/0222117 A1* | 8/2012 | Wong | H04L 63/02 726/23 |
| 2012/0324582 A1* | 12/2012 | Park | G06F 21/577 726/25 |
| 2013/0055386 A1 | 2/2013 | Kim et al. | |
| 2013/0061323 A1 | 3/2013 | Liske | |
| 2013/0247204 A1* | 9/2013 | Schrecker | H04L 45/306 726/25 |
| 2013/0254829 A1* | 9/2013 | Jakubowski | G06F 21/53 726/1 |
| 2013/0290234 A1* | 10/2013 | Harris | G06N 5/022 706/46 |
| 2013/0325935 A1* | 12/2013 | Kiley | G06F 17/30867 709/203 |
| 2014/0032609 A1* | 1/2014 | Brinkman | G06F 17/30911 707/803 |
| 2014/0189808 A1* | 7/2014 | Mahaffey | H04L 63/083 726/4 |
| 2014/0317754 A1* | 10/2014 | Niemela | H04L 63/1416 726/26 |
| 2014/0325646 A1* | 10/2014 | Turgeman | G06F 21/316 726/22 |
| 2014/0344927 A1* | 11/2014 | Turgeman | H04W 12/06 726/22 |
| 2015/0033331 A1 | 1/2015 | Stern et al. | |
| 2015/0134956 A1* | 5/2015 | Stachura | H04L 63/0807 713/168 |
| 2015/0205957 A1* | 7/2015 | Turgeman | G06F 21/554 726/23 |
| 2016/0065600 A1* | 3/2016 | Lee | H04L 63/1416 726/23 |
| 2016/0352719 A1* | 12/2016 | Yu | G06F 21/45 |
| 2017/0085588 A1* | 3/2017 | Laidlaw | G06F 21/552 |
| 2017/0091450 A1* | 3/2017 | Turgeman | G06F 21/554 |
| 2017/0264701 A1* | 9/2017 | Wei | H04L 67/2814 |

* cited by examiner

WEB INJECTION PROTECTION METHOD AND SYSTEM

TECHNICAL FIELD

The present invention relates to methods and systems for detecting potential malware and malware and remediating such situations.

BACKGROUND

Some forms of malware use a technique known as "form-grabbing". This is accomplished by the malware hooking into browser functions responsible for sending data, i.e., corresponding to a form, to a remote server, typically associated with an intended recipient. By intercepting the data before it is encrypted via the Secure Socket Layer (SSL), the malware can read the HTTP header and submitted data and steal usernames and passwords from HTTP POST data being sent to a target website.

Web injects, are one form of malware, which typically function in a manner similar to a form-grabber. Instead of intercepting data being sent to the website, web injects intercept the data being sent from the website to the browser. The interception occurs after the data is decrypted (SSL) but before the browser displays it, giving the malware the ability to modify webpages dynamically.

Figure 1A:
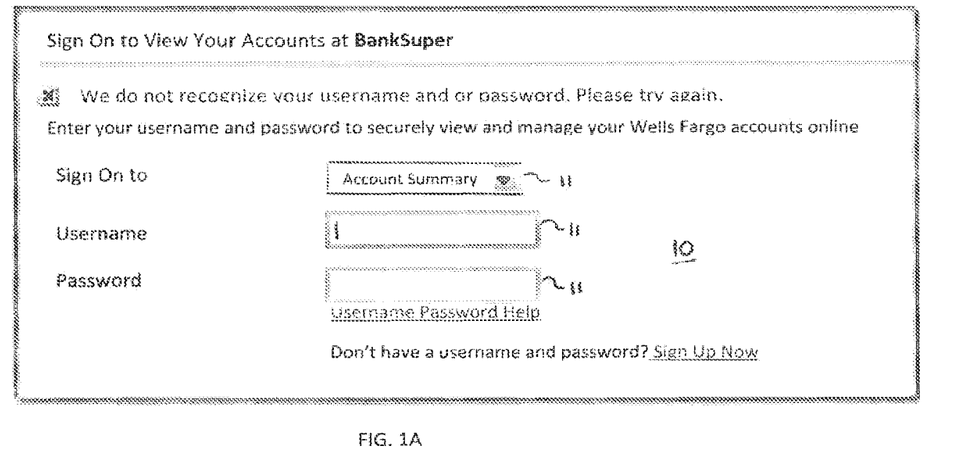
FIGS. 1A and 1B are diagrams of a normal electronic form, and the electronic form with a web inject, respectively, as displayed from the browser of a user computer.
Figure 1B:
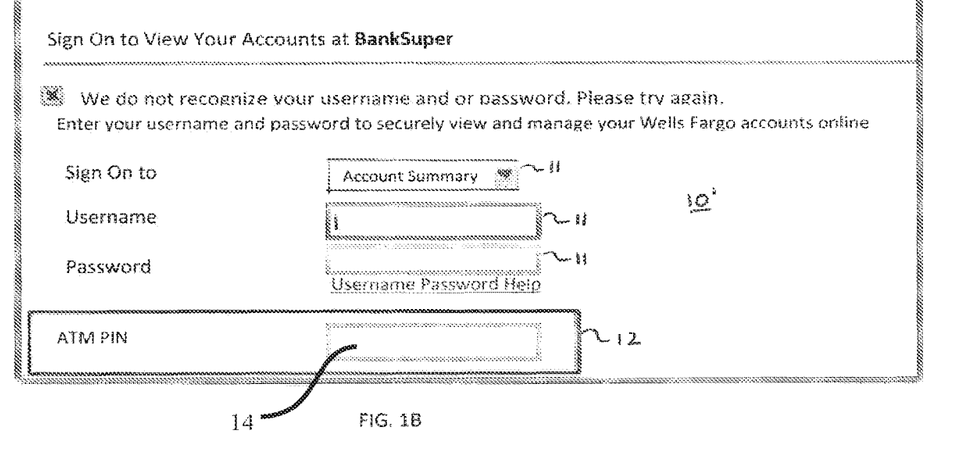

FIGS. 1A and 1B show an exemplary operation for a web inject, with an electronic form associated with a bank account. Typically, absent a web inject, a user/customer computer has requested and receives a form 10, which is the legitimate, authorized and authentic form, with input fields (input blocks) 11, shown in FIG. 1A, via the browser associated with the user computer. FIG. 1B shows the electronic form 10' with a web inject 12, making it an unauthorized electronic form. The web inject 12 being code injected into the code for the form 10', after the authorized form 10 data is decrypted, but before the form 10' is displayed by the browser of the user/customer computer. The web inject 12 provides a block (input field) 14 for additional information, for example, the user's ATM PIN, to be input by the user. This additional information, coupled with the other input from the input fields 11 of the form 10', once transmitted to and received at a target destination by malicious entities, may be used to hack the user/customer's account, or for other malicious and unintended purposes.

SUMMARY OF THE INVENTION

The present invention is directed to computerized methods and systems, which detect unauthorized and potentially malicious, as well as malicious records, typically in the form of electronic forms, such as those where users input information (into input blocks or fields), such as bank and financial institution electronic forms and the like. Should such an unauthorized form, be detected, the detection causes the taking of protective action by the computer whose on whose browser the unauthorized form has been rendered.

Embodiments of the present invention are directed to a method for detecting unauthorized electronic forms. The method comprises: obtaining an electronic form including at least one input field; analyzing the obtained electronic form against a record of an authorized (e.g., authentic or genuine) electronic form by comparing input fields of the obtained electronic form with input fields of the authorized electronic form for correlations; and, causing the taking of protective action in accordance with the correlations between the input fields of the obtained electronic form.

Optionally, the electronic form includes HTML data.

Optionally, the analyzing includes identifying an electronic form from the record of the authorized form according to an associated Uniform Resource Locator.

Optionally, the obtained electronic form includes active content.

Optionally, the active content includes Javascript.

Optionally, the analyzing additionally comprises: obtaining the electronic form by rendering the electronic form prior the comparing against the record of the authorized electronic form.

Optionally, the correlations include matches of the input fields of the obtained electronic form with the input fields of the authorized electronic form; and, the causing the taking of protective action in accordance with the correlations occurs when the correlations fail to meet a predetermined standard.

Optionally, the taking protective action includes blocking access to the form.

Optionally, the taking protective action includes displaying a message.

Optionally, the taking protective action includes notifying a system administrator.

Optionally, the taking protective action includes disabling use of the affected machine.

Optionally, the taking protective action includes disconnecting the affected machine from the network.

Embodiments of the invention are directed to a computer system for detecting unauthorized electronic forms received via a network, e.g., the Internet. The system comprises: a database for storing records of electronic forms, the electronic forms including input fields; a storage medium for storing computer components; and, a computerized processor for executing the computer components. The computer components comprise: a computer module configured for: obtaining an electronic form including at least one input field; analyzing the obtained electronic form against a record of an authorized electronic form from the database, by comparing input fields of the obtained electronic form with input fields of the authorized electronic form for correlations; and, causing the taking of protective action in accordance with the correlations between the input fields of the obtained electronic form.

Optionally, the computer module is configured such that the analyzing includes identifying an electronic form from the record of the authorized form according to an associated Uniform Resource Locator in the database.

Optionally, the computer module is configured such that the correlations include matches of the input fields of the obtained electronic form with the input fields of the authorized electronic form; and, the causing the taking of protective action in accordance with the correlations occurs when the correlations fail to meet a predetermined standard.

Optionally, the computer module includes an agent.

Optionally, the computer system additionally comprises: at least one machine in electronic communication with the database over the network, for obtaining data associated with electronic forms over the network.

Embodiments of the invention are directed to a computer usable non-transitory storage medium having a computer program embodied thereon for causing a suitable programmed system to detect unauthorized electronic forms, accessible via a network, by performing the following steps when such program is executed on the system. The steps comprise: obtaining an electronic form including at least one input field; analyzing the obtained electronic form against a record of an authorized electronic form by comparing input fields of the obtained electronic form with input fields of the authorized electronic form for correlations; and, causing the taking of protective action in accordance with the correlations between the input fields of the obtained electronic form.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

A "Uniform Resource Locator (URL)" is the unique address for a file, a web site or a web page, that is accessible on the Internet or other network, including a public or wide area network.

HTML (Hypertext Markup Language) is the set of markup symbols or codes inserted in a file intended for display on a World Wide Web browser page.

The term "linked" as used herein includes both wired or wireless links, either direct or indirect, and placing the computers, including, servers, components and the like, in electronic and/or data communications with each other.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 3 is a diagram of the architecture of an exemplary system embodying the invention; and, FIG. 4 is a flow diagram illustrating the process performed by the injection mitigation plug-in.

DETAILED DESCRIPTION OF DRAWINGS

The present invention is directed to detecting unauthorized and potentially malicious, as well as malicious records, typically in the form of electronic forms, such as those where users input information (into input blocks or fields), such as bank and financial institution electronic forms and the like. An agent install on an end-point client monitors browser activity of the client's computer, machine, or the like. Once the user accesses a protected portal or other similar destination, for example, along a network, such as the Internet, the agent checks any log-in form for the input elements that are in the form (electronic form) and compare it with authentic (authorized, actual and genuine) forms in a predefined database, including the agent's database. Should an unauthorized electronic form be detected, the agent may cause the computer to take protective action, from possible damaging effects of the unauthorized and potentially malicious form.

Figure 2:
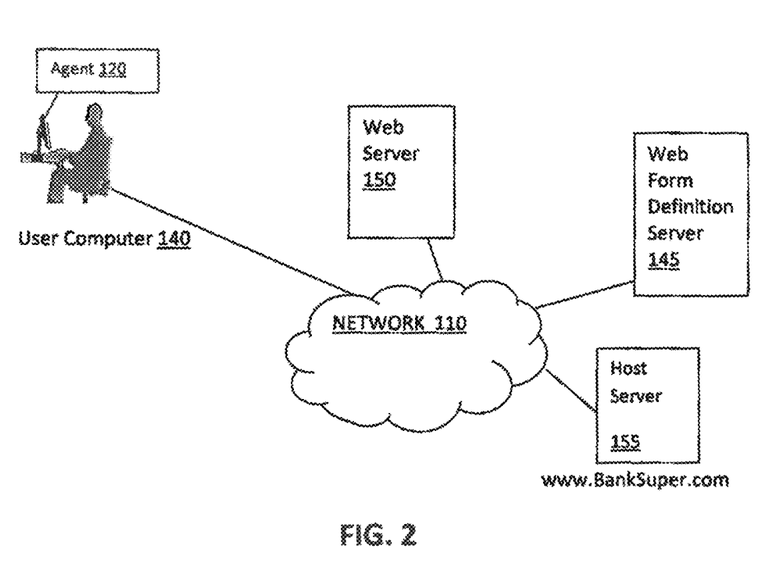
FIG. 2 is a diagram illustrating a system environment in which an embodiment of the invention is deployed.

FIG. 2 illustrates an example environment in which embodiments of the invention are performed over a network 110. The network 110 may be formed of one or more networks, including for example, the Internet, cellular networks, wide area, public, and local networks. The invention includes a system, for example, an agent 120, on an end-point client, for example, a user computer 140 (linked to the network 110). The agent 120 maps to a web form definition server 145. The agent 120 includes software, software routines, code, code segments and the like, embodied, for example, in computer components, modules and the like, that are installed on machines, such as the user computer 140. For example, the agent 120 performs an action when a specified event occurs. The web form definition server 145 may also be part of the system.

There is also a web server 150, linked to the network 110, and which is linked to both the user computer 140 and the web form definition server 145 (via the network 110). The web form definition server 145 receives and collects authoritative web form data structures, including, for example, Uniform Resource Locators (URLs), and associated web form data, which is known to be authentic and legitimate. The web form definition server 145 is in electronic communication or otherwise linked with the web form database 270 of the agent 120, as detailed below.

The user computer 140 accesses the Web Server 150 via the network 110. Software located on the User Computer 140 may, for example, utilize information retrieved from the Web Form Definition Server 145 to detect web-based malware, as described in detail below with reference to FIG. 4.

A host server 155 is linked to the network 110 and represents numerous servers hosting, for example, bank web sites, from which forms, such as the form 10, with input fields, of FIG. 1A, are provided to users, such as the user at the user computer 140. For example, host server 155 hosts the web site of a bank known as "BankSuper", with the URL, wwwBankSuper,com, from which users, can access the various forms for managing their accounts with BankSuper.

Figure 3:
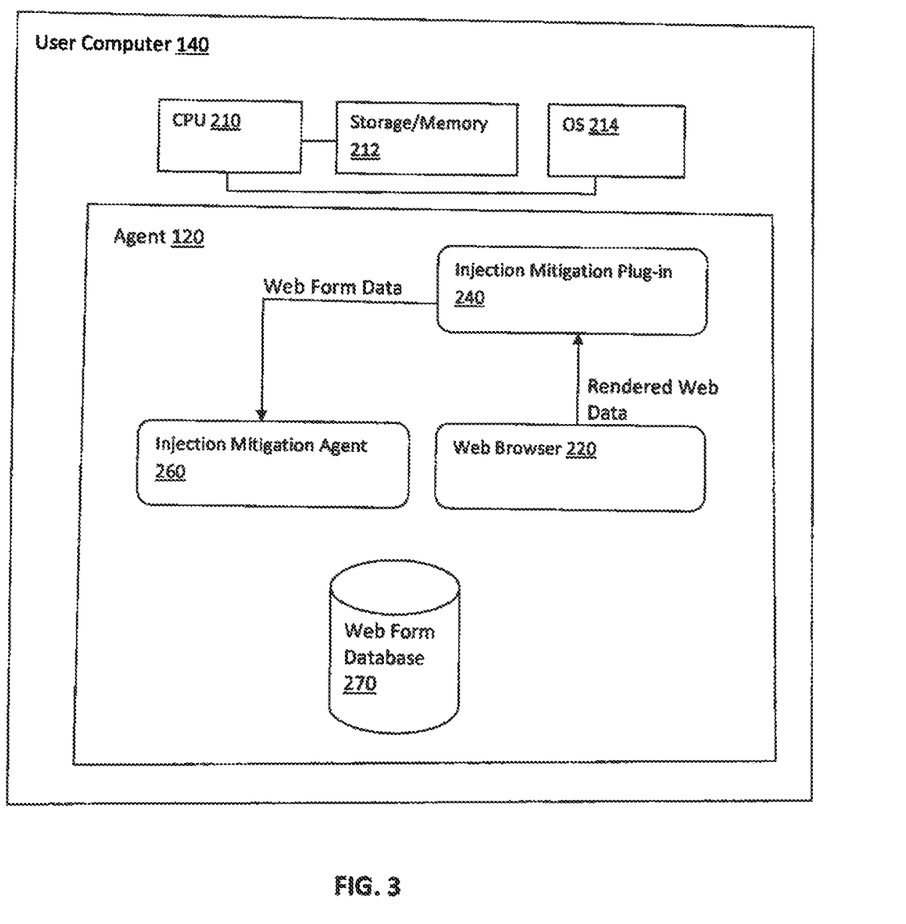

FIG. 3 illustrates an example architecture of the User Computer 140 and the agent 120 as incorporated therein, in accordance with embodiments of the invention. Initially, the user computer 140 includes a central processing unit (CPU) 210, Storage/Memory 212, operating system (OS) 214, and a web browser 220. The processors of the CPU 210 and the storage/memory 212, although shown as a single component for representative purposes, may be multiple components. The agent 120, as installed on the computer 140, as, for example, a client, includes a plug-in 240, an injection mitigation agent 260, installed via the plug-in 240, and a web form database 270.

Figure 4:
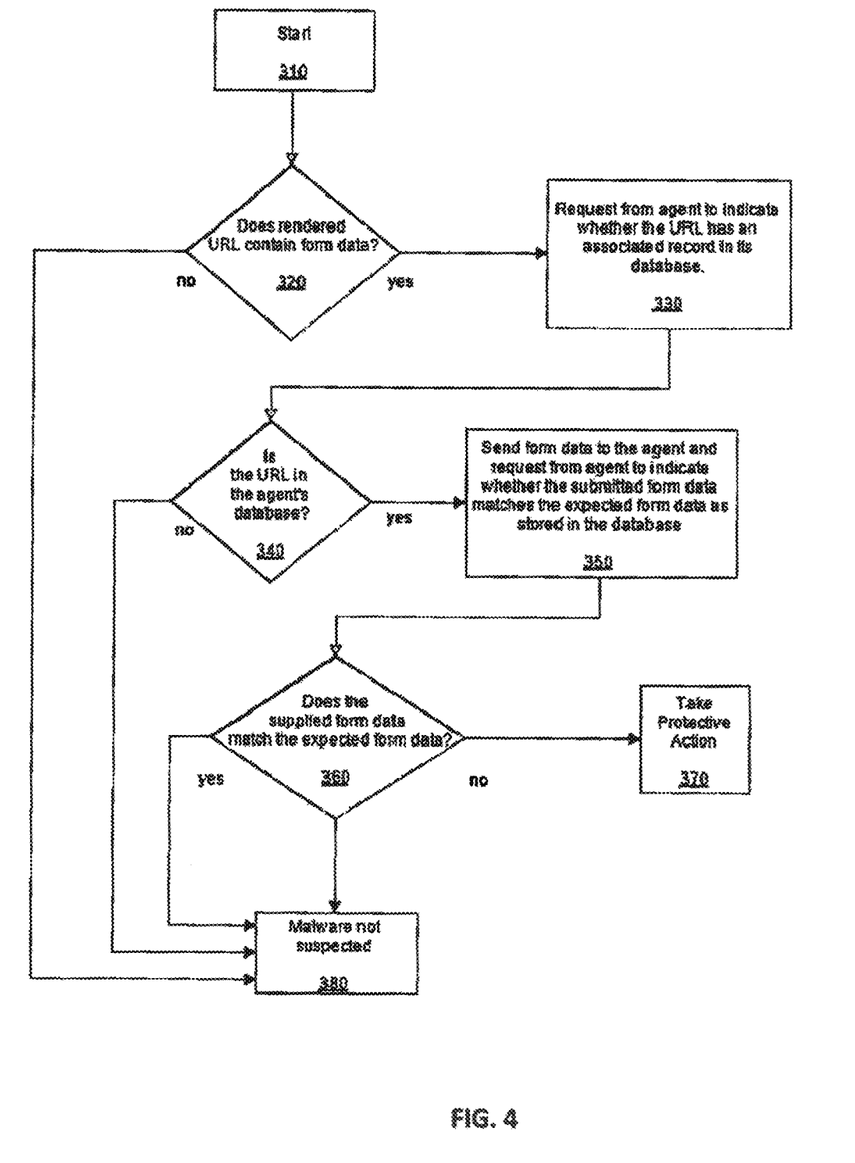

The CPU 210 is formed of one or more processors, including microprocessors, for performing the computer 140 functions, including executing the functionalities and operations of the agent 120, as detailed herein, the operating system 214, and including the processes shown and described in the flow diagram of FIG. 4. The processors are, for example, conventional processors, such as those used in servers, computers, and other computerized devices. For example, the processors may include x86 Processors from AMD and Intel, Xenon® and Pentium® processors from Intel, as well as any combinations thereof.

The storage/memory 212 is any conventional storage media. The storage/memory 212 stores machine executable instructions for execution by the CPU 210, to perform the processes of the invention. The storage/memory 212 also includes machine executable instructions associated with the operation of the components, including the agent 120, and all instructions for executing the processes of FIG. 4, detailed herein.

The operating system (OS) 214 includes any of the conventional computer operating systems, such as those available from Microsoft of Redmond Washington, commercially available as Windows® OS, such as Windows® XP, Windows® 7, MAC OS from Apple of Cupertino, Calif., or Linux.

The Web Browser 220 is, for example, any web browser used on a computer system for accessing data on the world-wide web, such as, for example, Microsoft® Internet Explorer® or Mozilla Firefox®. The web browser 220 sends the rendered forms to the injection mitigation agent 260 for evaluation, and if necessary, causes the activation of protective action.

The Injection Mitigation plug-in 240 is a software component that adds features to the web browser 220. The injection mitigation plug-in 240 operates to install the injection mitigation agent 260, which in turn, for example, operates on web form data after the web code for the web form has been rendered into displayable data by the browser 220. The Injection Mitigation Plugin 240 is installed, for example, into the Web Browser 220 using, for example, the plug-in architecture native to the specific Web Browser 220.

The Injection Mitigation Agent 260 is, for example, software which runs as a background process on the operating system 214 of the User Computer 140. The injection mitigation agent 260 functions to detect records, such as electronic forms ("electronic forms" and "forms" used interchangeably herein), such as the form 10 of FIG. 1A with input fields, that have been maliciously modified (for example, the form 10' of FIG. 1B) by locally installed malware from legitimate form data. The injection mitigation agent 260 also performs real-time evaluation of web forms for potential forgery, as described in detail below, with reference to FIG. 4.

The Injection Mitigation agent 260 operates, for example, on the web form data after the web code has been rendered into displayable data, e.g., forms 10, 10' with input fields 11, such as those of FIGS. 1A and 1B) by the browser. By, for example, doing this, the Injection Mitigation agent 260 is able to detect records (electronic records), forms, and other electronic documents, that have been maliciously modified by locally installed malware from legitimate form data, for example, by web injection. These maliciously modified and unauthorized records, are, for example, maliciously modified and unauthorized forms, with the modified and unauthorized content, including, for example, additional input blocks or input fields (when compared to the corresponding legitimate and authorized form).

In an exemplary series of processes to detect a potentially malicious electronic form created by a web-inject, the injection mitigation agent 260 looks for the electronic login form, which has been rendered to the browser 220, or receives the form from the browser 220. The electronic form is typically in HTML. The electronic form, for example, includes active content and javascript.

The injection mitigation agent 260 then queries the web form database 270 for Uniform Resource Locators (URLs), and associated web form data (representative of a form with input fields), which is known to be authentic and legitimate. Should the web form database 270 provide a form, the login form is compared with the provided form for elements. In cases where the elements, e.g., input fields 11 of the authorized 10 and unauthorized 10' forms (FIGS. 1A and 1B), are changed, such as the number of elements or types of elements have changed, beyond acceptable limits as programmed into the agent 260, the agent 260 will initiate (by signaling) the taking of protective action by the end-point client, e.g., the user computer 140, to take protective actions. For example, protective actions include remediations such as: 1) blocking the user from logging into the web-inject modified form, and otherwise blocking access to the form; 2) displaying a message, warning window, or the like, for example, by hacking into the browser 220 and changing the page; 3) suspending the administrative account of the user, for example, by locking the user computer 140; 4) alerting or notifying the system administrator about this security incident; and 5) quarantining the user computer 140, e.g., blocking the user computer 140 from accessing the network 110, or otherwise disconnecting the user computer from the network 110, or disabling the user computer 140.

Protective action, including the aforementioned remediations, is taken regardless of the fact that the web-inject may actually be malware or other malicious software.

The Injection Mitigation Agent 260 performs, for example, additional functions. One function is the maintenance of the Web Form Database 270. To maintain the Web Form Database 270, the Injection Mitigation Agent 260, for example, periodically connects to the Web Form Definition Server 145, via the network 110, and retrieves, for example, authoritative web form data structures from the Web Form Definition Server 145. The authoritative web form data structures include, for example, a list of URLs and associated web form data that is known to be authentic and legitimate. The Injection Mitigation Agent 260 sends this data for storage on the Web Form Database 270.

Attention is now directed to FIG. 4 which shows a flow diagram detailing a computer-implemented process in accordance with embodiments of the disclosed subject matter.

Reference is also made to elements shown in FIGS. 2 and 3. The process and subprocesses of FIG. 4 are computerized processes performed by entities including the injection mitigation agent 260. The aforementioned processes and subprocesses are for example, performed automatically, but can be, for example, performed manually, and are performed, for example, in real time.

In FIG. 4, the process begins at a START block 310. At this block 310, the web definition server 145 continuously updates with forms, such as bank account forms from the world wide web (WWW), and the browser 220 is continuously monitoring for URLs, form data, forms, and the like. This form is part of a page element, and the page is driven by a URL. The web form definition server 145 is also continuously transmitting authoritative web form data structures to the web form database 270, to update this database 270. The transmitted authoritative web form data structures include, for example, URLs and associated web form data that is known to be authentic and legitimate. The web form definition server 145 receives the aforementioned, data structures, URLs and data, from various sources along the network, including the host server 155, which provides BankSuper URLs and form data. The URL for the form to be examined by the agent 120 is then sent (by the browser 220) to the injection mitigation agent 260.

The process moves to block 320, where the injection mitigation agent 260 determines whether the rendered URL contains form data. If the URL does not contain form data, the process moves to block 380, where malware is not suspected and the process may resume from block 310. Should the URL contain form data, the process moves to block 330.

At block 330, the injection mitigation agent 260 requests from the database 270 and/or the web form definition server 145, whether there is a corresponding record, e.g., form, therein. The process then moves to block 340.

At block 340, the injection mitigation agent 260 checks the URL itself of the form in the database 270. This URL is, for example, the domain or host such as www.BankSuper.com, in the database 270. Should the URL associated with the form not be in the database 270, the process moves to block 380. However, should the URL associated with the form be in the database 270, the form is considered to be a verified record, and the process moves to block 350.

At block 350, the form data (verified record) is sent from the database 270 to the injection mitigation agent 260. The injection mitigation agent 260 then compares forms to determine whether the submitted form data (from the URL) matches (or otherwise correlates with) the expected form data as stored in and received from the database 270. The process then moves to block 360.

At block 360, the injection mitigation agent 260 determines whether the supplied form data matches the expected form data (of the URL), and the sufficiency or correlation of the match, e.g., meeting a predetermined standard. Should the supplied form data sufficiently match the expected (known legitimate or authorized) form data (of the URL), the process moves to block 380. However, Should the supplied form data not match the expected form data (of the URL), or match insufficiently, e.g., fail to meet a predetermined standard, the process moves to block 370.

At block 370, malware is at least suspected, whereby the injection mitigation agent 260 signals the computer 140 operating system to take protective action, This protective action includes, for example, one or more of: 1) blocking the user from logging into the web-inject modified form, and otherwise blocking access to the form; 2) displaying a message, warning window, or the like, for example, by hacking into the browser 220 and changing the page; 3) suspending the administrative account of the user, for example, by locking the user computer 140; 4) alerting or notifying the system administrator about this security incident; and, 5) quarantining the user computer 140, e.g., blocking it from accessing the network 110, or otherwise disconnecting it from the network 110, or disabling the user computer 140.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for detecting unauthorized electronic forms, comprising:
    analyzing a rendered uniform resource locator (URL) to determine whether the URL includes form data for an obtained electronic form from a user, the obtained electronic form including at least one input field; and,
    if it is determined that the URL includes form data for the user obtained electronic form including at least one input field:
    analyzing the user obtained electronic form against a record of a corresponding and existing authorized electronic form associated with the URL, by comparing input fields of the user obtained electronic form with input fields of the authorized electronic form for correlations; and,
    taking protective action in accordance with the correlations between the input fields of the user obtained electronic form and the authorized electronic form.

2. The method of claim 1, wherein the user obtained electronic form includes HTML data.

3. The method of claim 1, wherein the record of the corresponding authorized electronic form associated with the Uniform Resource Locator is stored in a database for the URL.

4. The method of claim 1, wherein the user obtained electronic form includes active content.

5. The method of claim 4, wherein the active content includes Javascript.

6. The method of claim 2, wherein the correlations include matches of the input fields of the user obtained electronic form with the input fields of the authorized electronic form; and, the taking of protective action in accordance with the correlations occurs when the correlations fail to meet a predetermined standard.

7. The method of claim 1, wherein the taking protective action includes blocking access to the form.

8. The method of claim 1, wherein the taking protective action includes displaying a message.

9. The method of claim 1, wherein the taking protective action includes notifying a system administrator.

10. The method of claim 1, wherein the taking protective action includes disabling use of the affected machine.

11. The method of claim 1, wherein the taking protective action includes disconnecting the affected machine from the network.

12. A computer system for detecting unauthorized electronic forms received via a network, comprising:
 a database for storing records of electronic forms, the database associated with uniform resource locators (URLs), the electronic forms including input fields;
 a storage medium for storing computer components; and,
 a central processing unit (CPU) including at least one processor for executing the computer components comprising:
  a computer module configured for:
   analyzing a rendered uniform resource locator (URL) to determine whether the URL includes form data for an obtained electronic form from a user, the obtained electronic form including at least one input field; and,
   if it is determined that the URL includes form data for the user obtained electronic form including at least one input field:
    analyzing the user obtained electronic form against a record of a corresponding and existing authorized electronic form from the database of the associated URL, by comparing input fields of the user obtained electronic form with input fields of the authorized electronic form for correlations; and,
    taking protective action in accordance with the correlations between the input fields of the user obtained electronic form and the authorized electronic form.

13. The computer system of claim 12, wherein the computer module is configured such that the correlations include matches of the input fields of the user obtained electronic form with the input fields of the authorized electronic form; and, the taking protective action in accordance with the correlations occurs when the correlations fail to meet a predetermined standard.

14. The computer system of claim 13, wherein the computer module includes an agent.

15. The computer system of claim 13, additionally comprising at least one machine in electronic communication with the database over the network, for obtaining data associated with electronic forms over the network.

16. A computer usable non-transitory storage medium having a computer program embodied thereon for causing a suitably programmed system to detect unauthorized electronic forms, accessible via a network, by performing the following steps when such program is executed on the system, the steps comprising:
 analyzing a rendered uniform resource locator (URL) to determine whether the URL includes form data for an obtained electronic form from a user, the obtained electronic form including at least one input field; and,
 if it is determined that the URL includes form data for the user obtained electronic form including at least one input field:
  analyzing the user obtained electronic form against a record of a a corresponding and existing authorized electronic form associated with the URL, by comparing input fields of the user obtained electronic form with input fields of the authorized electronic form for correlations; and,
  taking protective action in accordance with the correlations between the input fields of the user obtained electronic form and the authorized electronic form.

* * * * *